May 5, 1931.  V. JANTSCH  1,803,938
UNDERSLUNG TIRE CARRIER
Filed Nov. 3, 1927
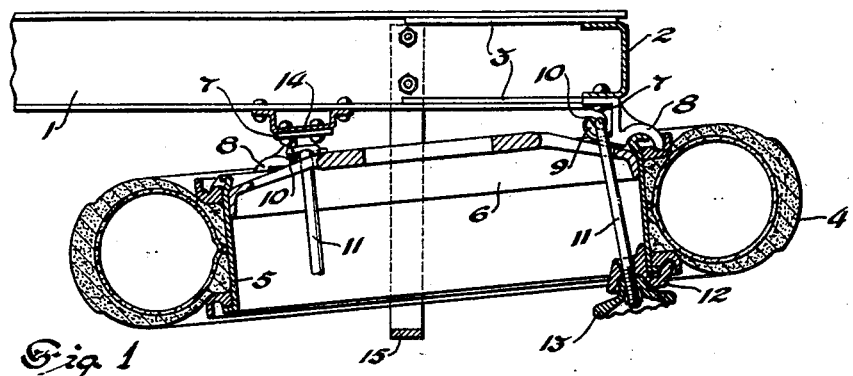
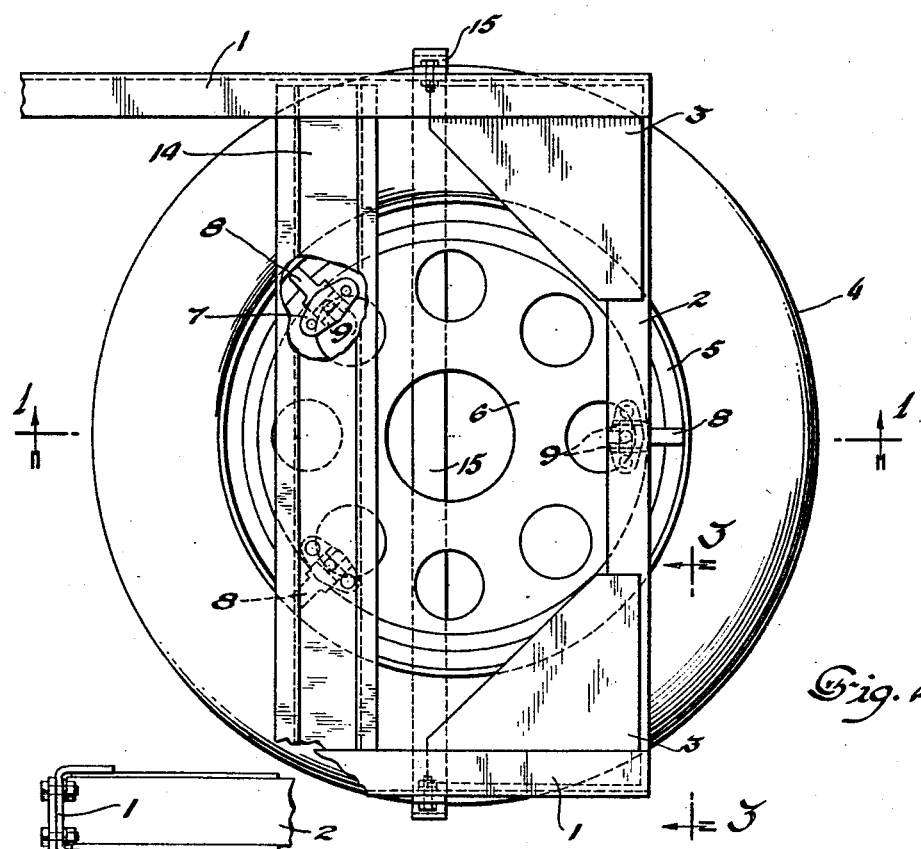
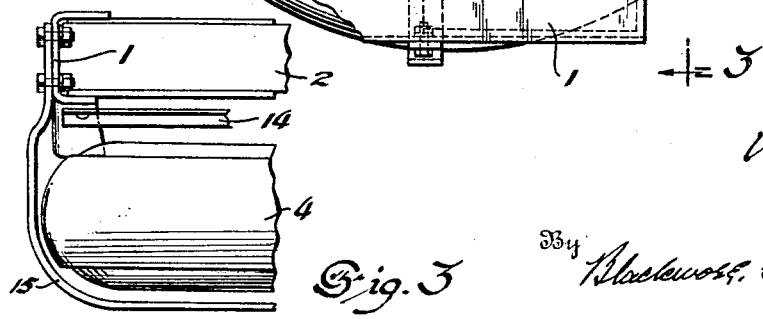
Inventor
Victor Jantsch Patented May 5, 1931

1,803,938

UNITED STATES PATENT OFFICE

VICTOR JANTSCH, OF PONTIAC, MICHIGAN, ASSIGNOR TO YELLOW TRUCK & COACH MANUFACTURING COMPANY, OF PONTIAC, MICHIGAN, A CORPORATION OF MAINE

UNDERSLUNG TIRE CARRIER

Application filed November 3, 1927. Serial No. 230,802.

This invention relates to motor vehicles, and particularly to tire carriers for use therewith.

Certain motor vehicles, such as trucks, have a chassis frame that extends for some distance beyond the rear axle, and in the event the frame is not swung too low or close to the ground, there is sufficient clearance beneath the frame to provide a convenient location for carrying spare or extra tires in a horizontal position. With the present trend in automobile design toward low hung frames, it is found desirable to secure the spare tire as close to the underside of the frame as is practicable, so as to leave ample clearance above the ground when the vehicle is loaded down, that there will be no danger of damage to the tire, such as might be caused by the striking of obstacles in the road.

It is one of the primary objects of the present invention to provide an improved carrier that will necessitate but a minimum amount of space to securely hold a tire in position beneath the rear portion of the frame.

A further object of the invention is to provide a device that will comprise but a few parts so as to be simple and economical to manufacture, and which in use will be easy and convenient to handle.

Other objects and advantages will be apparent from the following specification, taken with the accompanying drawings, wherein Fig. 1 is a longitudinal sectional view of the rear portion of a chassis frame with a tire carried thereby, in accordance with the present invention, the view being taken on line 1—1 of Fig. 2;

Fig. 2 is a top plan view of the structure shown in Fig. 1; and

Fig. 3 is a detail view looking in the direction of the arrows on line 3—3 of Fig. 2.

Referring to the preferred embodiment of the invention as illustrated in the drawings, 1—1 indicate a pair of longitudinally extending channeled side members or sills of the chassis frame, and 2 refers to a transverse cross member, also of channel shape, connecting the rear extremities of the side members, the side and cross members being braced to each other by reinforcing corner plates 3—3. Beneath the rear portion of the frame is to be suspended a spare tire 4, carried upon the rim 5, the rim in the drawings being shown secured on a disk wheel 6, to illustrate the use of the carrier with demountable wheels. It is to be understood, however, that either a rim alone may be carried, or a rim carrying an inflated or deflated pneumatic tire or one with a solid tire, depending on the particular equipment of the vehicle. To suspend the tire rim from the chassis, a number of attachment members are employed, each being identical in construction and comprising a fixed bracket 7, having a down-turned toe or tire-engaging ear 8, and a pair of upwardly curved fingers or forks 9, upon which rests the head or cross portion 10 of a removable T-bolt, the stem 11 of the bolt passing between the forked fingers 9 and at its lower end carrying a tire-engaging lug 12, movable relative to the fixed member 8 to clamp the tire rim therebetween, upon adjustment of the hand-wheel or ring nut 13 screw threaded on the stem 11. In the drawings, a three point suspension arrangement is shown wherein one bracket 7 is riveted or bolted at the center of the frame member 2, and the remaining two are carried in spaced relation, by a cross member 14 extending transversely between the side frame members 1—1, so as to engage the rim at substantially ninety degrees apart, and as near the sides of the frame as convenient, in order that the respective hand wheels 13 will be readily accessible from opposite sides of the vehicle.

Since the tires and rims employed on some of the larger vehicles are quite heavy and hard to manage, there is provided a U-shaped bar or strap 15, the upper ends of the side arms thereof being secured by rivets or bolts to the side members 1—1, with the bottom cross portion extending across the frame, to provide a rest and assist in the positioning and removal of the tire. The U-strap is thus an auxiliary to the suspension bolts and serves no other purpose than to support the weight of the tire and rim when they are being mounted, and because of the provision of this strap the operator is not called upon to expend a great deal of effort in attempting to hold the tire in proper position while manipulating the attachment elements to bring them into operative relation with the tire rim. For instance, when it is desired to mount a spare tire, the procedure is to lay the front edge of the tire on the cross portion of the U-bar 15 and slide it forward, at the same time tipping the tire up until the rim engages the two ears or toes 8 on the cross member 14. The U-bar is so positioned that at this time it will be just forward of the center of the wheel or rim, whereby the weight of the rim to the rear of the bar will of itself maintain the rim in engagement with the front ears 8. The operator may then reach in from either side of the chassis and insert the T-headed suspension bolts in the forked fingers of the front brackets and draw up the respective hand wheels 13. After this it is only necessary to lift the rear of the tire and adjust the rear central attachment members to securely hold the tire in position. Reversal of the procedure permits removal of tire.

From the above description it will be seen that there is provided an arrangement which enables a spare tire to be securely suspended from the underside of a frame and in close relation thereto, as to leave sufficient clearance above the ground to avoid obstructions in the road.

I claim:

1. The combination with a chassis frame, of tire-carrying means associated therewith, including tire-engaging brackets fixedly secured on the underside of the frame, each being provided with a pair of forked fingers, suspension bolts hung from said brackets, having T-shaped heads engageable with said forked fingers, and tire-engaging lugs adjustably carried by said bolts, upon which the weight of the tire is received and by the adjustment of which the tire is lifted into engagement with said brackets and firmly clamped in carrying position.

2. The structure of claim 1 and a U-shaped strap secured to and extending transversely of the frame, upon which the tire may be rested and tilted upwardly to assist the engagement therewith of the tire-engaging elements.

3. The combination with a chassis frame, of tire-carrying means associated therewith including relatively movable members for clamping the tire upwardly against the underside of the frame, and auxiliary means dependently carried by the frame and located below and out of engagement with the tire held by said members in carrying position, to receive and support the weight of the tire only at such times as it is being manipulated to and from tire-carrying position.

4. The combination with a chassis frame, of tire carrying means associated with the underside thereof, including a series of fixed tire-engaging members to engage the upper side of the tire at spaced points in its circumference, auxiliary means fixedly suspended from the frame in spaced relation with said members for engagement with the underside of the tire to assist in locating the same, and relatively adjustable tire-engaging members suspended from said fixed members to engage the underside of the tire and by adjustment to lift the tire out of engagement with the said auxiliary means and into engagement with said fixed members.

5. In an underslung tire carrier for vehicles, the combination with a chassis frame, of a tire engaging member fixed on the chassis frame, a tire supporting member movable relative to the fixed tire engaging member to clamp the tire therebetween, and means mounted on the chassis frame and spaced beneath the plane of the clamped position of said members to assist in supporting the tire during the manipulation of said adjustable supporting member.

6. In an underslung tire carrier for vehicles, the combination with a chassis frame, of means to clamp a tire in a substantially horizontal position against the underside of the frame, and a stationary support on the frame located below and out of engagement with the tire when in clamped position and which is adapted to assist in carrying the weight of a tire while it is being located in or removed from its clamped position.

7. In an underslung tire carrier for vehicles, the combination with a chassis frame, of means to hold a tire in a substantially horizontal position beneath the frame, and an element suspended from the frame below said means and out of engagement with the clamped tire to support the weight of the tire during its manipulation to and from the position in which it is held by said means.

8. In an underslung tire carrier for vehicles, the combination with a chassis frame, of fixed tire engaging surfaces on the underside of the frame, adjustable clamping elements suspended from the frame and adapted to support a tire and hold it against said fixed surfaces, and a U-shaped strap hung from the frame to provide a rest on which the tire may be tilted upwardly into engagement with fixed tire engaging surfaces.

9. In an underslung tire carrier for vehicles, the combination with a chassis frame, of a tire engaging member fixed on the underside of the frame, a pair of forked fingers associated with the underside of the frame, a dependent suspension bolt having a T-shaped head hooked over said fingers and a tire engaging element adjustable on said bolt, adapted to carry the weight of a tire and by its adjustment to clamp the tire against said fixed tire engaging member.

10. In an underslung tire carrier for vehicles, the combination with a chassis frame, tire engaging means fixed at the under side of the frame, auxiliary means fixed on the frame and located below said tire engaging means to support the tire at times of its mounting and removal, and adjustable means to lift the tire out of engagement with said auxiliary means and clamp it against the fixed tire engaging means.

In testimony whereof I affix my signature.

VICTOR JANTSCH.